Dec. 24, 1963  D. E. KRAUSE  3,114,995
AGRICULTURAL IMPLEMENT
Filed April 18, 1961  2 Sheets-Sheet 1

INVENTOR.
DAVID E. KRAUSE
BY
Emerson B. Donnell
ATTORNEY

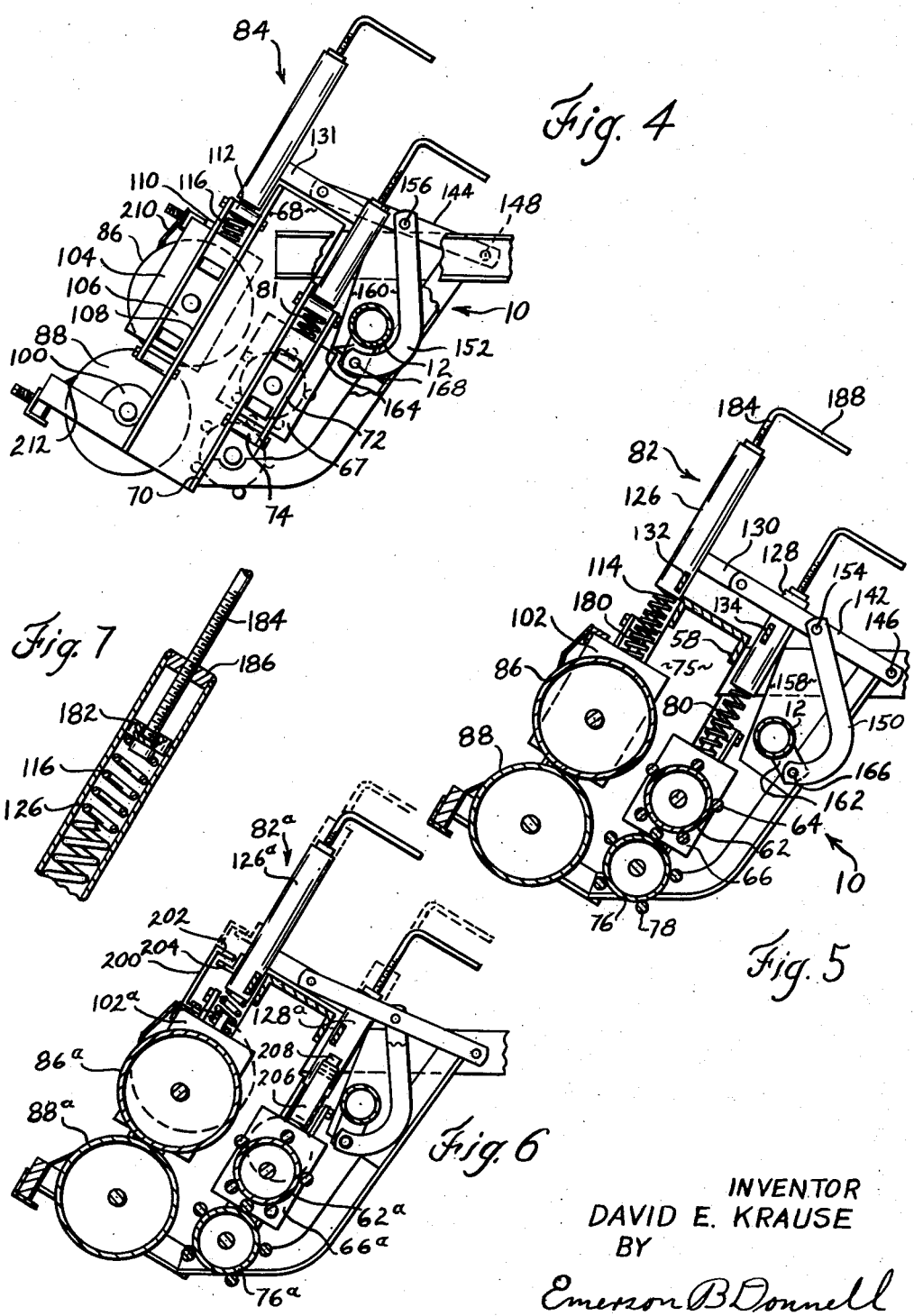

United States Patent Office 3,114,995
Patented Dec. 24, 1963

3,114,995
AGRICULTURAL IMPLEMENT
David E. Krause, Rockford, Ill., assignor to J. I. Case Company, Racine, Wis., a corporation of Wisconsin
Filed Apr. 18, 1961, Ser. No. 116,627
8 Claims. (Cl. 56—1)

The present application relates to hay conditioners of the type utilizing bruising or crushing rolls and an object thereof is to generally improve the construction and operation of devices of this type. Such machines involve pairs of opposed spring-pressed rollers which pick up hay from a swath and crush or otherwise treat it so that the juices will be released and spread over the surface in order that the hay may dry more rapidly and uniformly in the sun than it would without such treatment. In the operation of such machines the rolls will sometimes clog so that they slip on the mass of hay which is coming through and the action stops. Such clogging can usually be eliminated by relieving the spring pressure on the rolls so that they are easily forced apart by the crop coming in, and accordingly another object of the invention is to improve the means which are utilized for applying the spring pressure so that such pressure can be promptly relieved when desired.

A further object is to improve the abutments or means for backing up or supporting the springs which apply the pressure.

A further object is to provide means for guiding the abutments so that they can be readily shifted for changing the spring pressure, and a further object is to provide means for relieving the spring pressure and also actually physically separating the rolls.

The arrangements which have been devised for accomplishing these objects are fully set forth in the following specification and are illustrated in the accompanying drawings in which:

FIG. 4 is an enlarged vertical sectional view taken on the line 4—4 of FIG. 1 with parts broken away.

FIG. 5 is an enlarged vertical sectional view on the line 5—5 of FIG. 1.

FIG. 6 is a view similar to FIG. 5, showing the parts in a different position and with certain additions.

FIG. 7 is an enlarged axial sectional view of a portion of the structure shown in FIGS. 2 to 6 inclusive.

Figure 1:
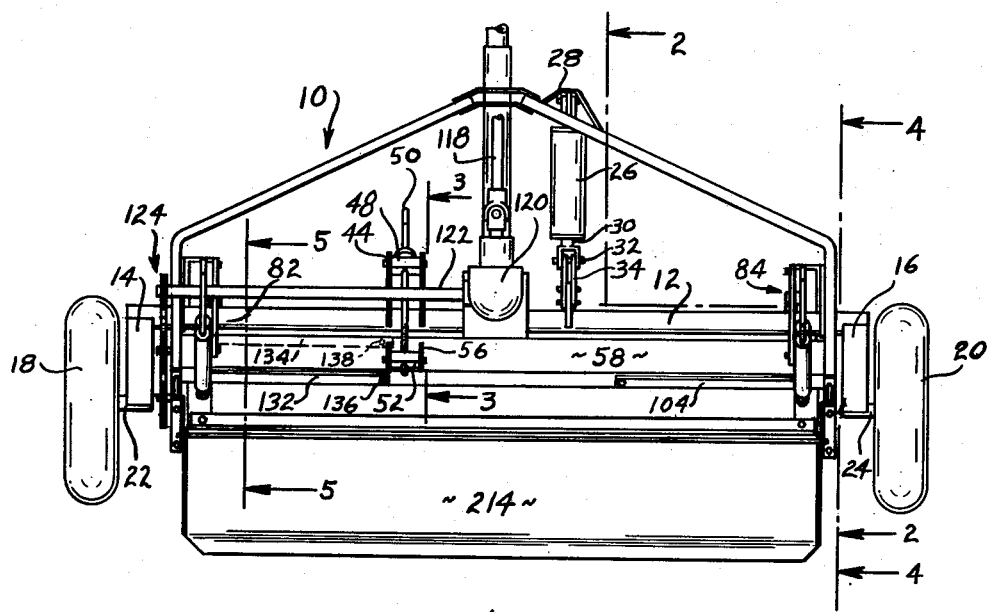
FIG. 1 is a plan view of a machine illustrative of the invention with parts broken away.

As seen in FIG. 1, the machine comprises a frame generally designated as 10 carried on a rock axle 12 having rigidly fixed therewith arms 14 and 16 on which are carried supporting wheels 18 and 20 journaled on spindles 22 and 24 which are offset from the axle 12 so that rocking of the axle will cause raising and lowering of the frame as is common in mechanisms of this general type.

Figure 2:
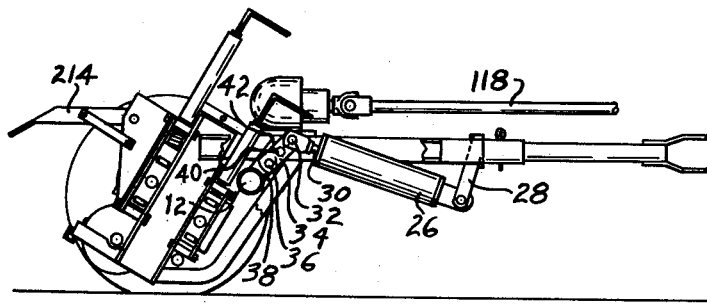
FIG. 2 is a vertical sectional view taken on the line 2—2 of FIG. 1.

Means is provided for rocking rock axle 12 in the form of a fluid motor comprising a cylinder 26 having one end pivoted to a bracket 28 fixed in any suitable manner on frame 10. Cylinder 26 has a piston rod 30, FIG. 2, pivoted at 32 to a link 34 pivoted at 36 to an ear 38 fixed on or in relation to axle 12. A stop 40 on link 34 engages a surface 42 on ear 38 in the working position of the parts so that link 34 and ear 38 move together in swinging axle 12 in a counterclockwise direction as seen in FIG. 2.

The provision of link 34 facilitates the atttachment and detachment of motor 26 in a well-known manner.

Figure 3:
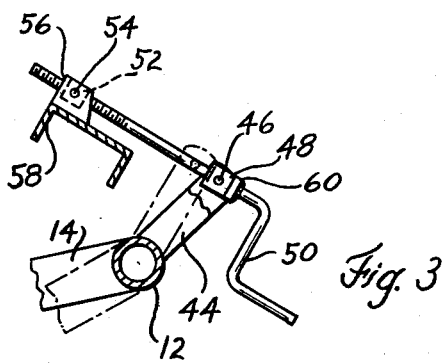
FIG. 3 is an enlarged detail of certain mechanism taken on the line 3—3 of FIG. 1, with parts broken away.

The height of the machine above the ground can be quite critical and can be readily controlled by the position of axle 12. For this reason an adjustable stop mechanism, particularly shown in FIG. 3, is provided. Axle 12 has an arm 44 extending in the present instance substantially parallel to above-mentioned ear 34, preferably bifurcated and carrying by means of trunnions 46 an apertured block 48. An adjusting crank or rod 50 is slidable through the aperture in block 48 and threaded into a similar block 52 having trunnions 54 engaged in a bracket 56 fixed on a channel member 58 forming a major portion of above-mentioned frame 10. A collar or thrust bearing 60 fixed on crank 50 engages above-mentioned block 48 and prevents relative sliding movement between the block and crank in one direction. The weight of the parts causes a tendency in axle 12 to turn in a clockwise direction as seen in FIG. 3, thereby maintaining block 48 forceably against collar 60. As will be apparent, turning of crank 50 will cause movement of block 48 in small increments to either the left or right according to the direction of turning of crank 50 and will therefore cause fine adjustment of the height of the machine above the ground. On the other hand, upon operation of motor 26 axle 12 will be rocked to a considerable extent in a counterclockwise direction, as indicated in broken lines, whereupon block 48 will slide along crank 50 as far as necessary to permit free lifting of the machine into transport position. Upon actuation of motor 26 in the other direction, axle 12 will rock clockwise until block 48 is in contact with collar 16 whereupon the machine will be restored to its previous adjusted height above the ground.

In the present illustrative machine, two pairs of crop treating rolls are used although it is to be understood that certain features of the invention would be equally applicable to a machine utilizing only a single pair of rolls. Thus as perhaps best seen in FIG. 5, a roll 62, in the present instance provided with a series of ridges as 64, is journaled at one end in a bearing element 66 of any suitable or conventional type and at the other end in a bearing portion 67 (FIG. 4), guided in the present instance for up-and-down movement against a channel member 68 constituting another part of frame 10. Member 68 has a flange 70 against which bearing member 67 is guided for sliding movement by means of a bar 72 spaced from flange 70 by suitable spacers as 74.

Roll 62 extends substantially the full width of the frame 10 or the length of frame portion 58 and bearing 66 is also slidable in a manner similar to above mentioned bearing 67 on a channel member 75 similar to above mentioned channel portion 68. As will be apparent, shifting of bearings 66 and 67 will provide for up-and-down movement of roll 62.

Roll 62 operates in close proximity to a similar roll 76 having a series of ridges as 78 and which are arranged to register with the spaces between the ridges 64 on roll 62. In this way, hay passing between the rolls is caused to be sharply bent and thereby crimped or cracked open so that the juices may escape to the surface.

Roll 62 through bearings 66 and 67 is urged toward roll 76 by springs as 80 and 81 interposed between the bearings and suitable abutment or housing means generally designated as 82 and 84. Since the two spring abutment housings are essentially identical, only one will be described in detail.

In the present machine an additional set of rolls 86 and 88 is provided having smooth surfaces interengaging each other between which the crop material is pressed and slightly crushed in order to further facilitate drying and curing. Roll 88 is journaled in a bearing as 100, FIG. 4, supported from channel 68, it being understood that a similar or identical bearing not shown is provided at the opposite end of roll 88. Roll 86 is carried in a bearing curing. Roll 88 is journaled in a bearing as 100, FIG. 4, Bearing 104 has a portion 106 which is guided against a flange 108 of channel portion 68 for sliding movement thereon, by a bar 110 spaced from flange 108 by means of suitable spacers 112. As will be understood, bearing portion 102 is similarly mounted and guided for sliding movement in relation to channel portion 75. Thus roll 86 is journaled at both ends, each of the bearing portions being slidable and urged in a direction to press roll 86 against roll 88 by means of springs 114 and 116.

Power for operating rolls 62, 76, 86, and 88 is obtained from a conventional power take-off shaft 118 which drives, through a gear set 120, a lay shaft 122 connected to the rolls through a chain drive generally designated as 124 which is conventional and need not be further described since it forms no part of the invention.

Returning to a more detailed description of the spring abutments or housings, housing 82, FIG. 5, includes a tube 126 and a tube 128 into which springs 114 and 80 respectively, may extend. Tubes 126 and 128 are connected by a rigid bar 130 so as to form a unitary assembly, and have elongated braces or arms 132 and 134 fixed respectively thereto and extending along the sides of above-mentioned frame portion 58 as shown in FIG. 1. Arms 132 and 134 are pivoted respectively at 136 and 138 to opposite sides of frame portion 58 at a substantial distance from their point of attachment to abutment portion 82. In this way the abutment portion is guided for up-and-down movement. While the movement is actually in the form of an arc, because of the substantial length of the arms 132 and 134, and the relatively extremely limited up-and-down movement of abutment portion 82, for all practical purposes portion 82 has straight-line movement toward and away from bearing portions 66 and 102.

It will be understood that abutment 84 is controlled in a similar manner by arms, such as for example 140.

It will now be apparent that abutments or housings 82 and 84 are effectively stabilized against sideward displacement in relation to the machine, or lengthwise of element 58. They are also stabilized against inadvertent displacement lengthwise of the machine by means of spring control links 142 and 144, FIGS. 4 and 5, pivoted respectively to portions 130 and 131, and to frame 10 at 146 and 148, respectively.

It will now be apparent that by shifting abutments 82 and 84 toward and away from bearing portions 66 and 102, 67 and 104, the pressure exerted by springs 80, 114, 81 and 116, can be changed or controlled. For so shifting abutments 82 and 84, links or lift straps 150 and 152 are provided, pivoted in the present instance respectively to links 142 and 144 at 154 and 156. Rock axle 12 is journaled in plates 158 and 160 constituting a part of above-mentioned frame 10 and has ears or crank arms 162 and 164 fixed thereon or relatively thereto and extending generally radially therefrom. Ears 162 and 164 are pivoted respectively at 166 and 168 to above-mentioned links 150 and 152, the latter being curved or offset so that pivots 166 and 168 may follow a path which will place axle 12 between pivots 154 and 166 and also between pivots 156 and 168. Rocking of axle 12 upon raising or lowering of the machine by actuation of motor 26 will thus cause displacement or swinging links 142 and 144 and generally upward or downward movement of abutments 82 and 84.

It is to be noted, however, that in the position of the parts shown in FIG. 4, namely, the "down" position, pivot 168 is virtually in "dead center" relation to pivot 156 and rock axle 12 so that slight movements of axle 12 as for example in adjusting the height of operation of the machine will have little if any influence upon the position of link 144. On the other hand in the FIG. 5 position of the parts pivot 166 is in a favorable position to cause swinging of link 142 as a result of rocking of rock axle 12. Thus while a large movement of axle 12 as, for example, shifting from working to transport position will cause a substantial movement of abutments 82 and 84, in the working position of the parts, rocking of the axle for operative height adjustment purposes will not disturb the position of abutments 82 and 84.

As the parts shift from the FIG. 4 position to that of FIG. 5, abutments 82 and 84 are moved a substantial distance in a generally upward direction, or in any event away from bearing portions 66 and 102, 67 and 104, so that the pressure of springs 80 and 114, 81 and 116 is greatly reduced or eliminated whereby material which may have accumulated and failed to get between the rolls and which, therefore, may have clogged the machine, may be readily pulled in and carried through. Thus, if the machine clogs, it is merely necessary to raise it momentarily to transport position by actuation of motor 26 in the usual or conventional manner whereupon the machine will be cleared and may be immediately lowered to continue operation.

Springs 80, 114, 81 and 116 are preferably substantially alike and it will be necessary to describe only one in detail. As seen in FIG. 5, spring 116 is engaged with bearing portion 102 on a pin or pilot 180 and extends away from bearing portion 102 into above-mentioned tube 126. Within tube 126 it is seated on a plunger 182, FIG. 7, slidable within tube 126 and urged toward bearing portion 104 or generally downwardly in FIG. 7, by a screw 184 threaded into a head 186 fixed in the upper end of the tube. Screw 184 as seen in FIG. 5, has a bent portion or handle 188 by which it may be readily turned for adjusting plunger 182 within tube 126. In this manner, the pressure of roll 86 against roll 88 may be readily and accurately controlled, it being understood that a similar construction is associated with spring 114 and above-mentioned springs 80 and 81. By adjustment of the latter springs, the pressure of roll 62 against roll 76 may be adjusted in like manner.

At times it may be desirable to actually physically separate the rolls from each other and this may readily be done as shown in FIG. 6. A bearing portion 102ª similar to above-mentioned bearing portion 104 has a roll lift bracket 200 providing a lip portion 202 projecting into the path of a lug 204 fixed on or in relation to a spring housing tube 126ª. As illustrated, bearing portion 102ª is free to rise and fall to a limited extent without any interference from lug 204. On the other hand, in the event of substantial upward movement of spring abutment 82ª, lug 204 will encounter lip portion 202 and further movement will positively and physically raise bearing portion 102ª and remove roll 86ª from contact with roll 88ª. A substantially similar roll lift bracket 206 is fixed to a bearing portion 66ª and is raised by a lug 208 fixed on or in relation to a tube 128ª. Substantial movement of abutment 128ª, therefore, also lifts bearing portion 66ª and roll 62ª away from roll 76ª. It is to be understood that a substantially identical construction is associated with an abutment 84ª not shown so that both sets of rolls are separated whenever abutments 82ª and 84ª are raised as the machine is raised into transport position. The approximate positions of the parts in this modification when the machine is raised are indicated in FIG. 6 in dotted lines.

Scrapers 210 and 212, FIG. 4, of any suitable or conventional type are supplied for continuously cleaning rolls 86 and 88 and a hood or baffle 214 FIGS. 1 and 2 is arranged at the rear and above rolls 86 and 88 to intercept the material being discharged and prevent it from being thrown an excessive distance.

The operation of the machine is thought to be clear from the foregoing description, it being apparent that crop material is drawn in between rolls 62 and 67 where it is bruised or crimped and passed immediately between the smooth rolls 86 and 88 where it is crushed. In the event that any material fails to go in, the spring pressure on the rolls may be promptly relaxed by the relatively simple process of raising the machine into transport position. On the other hand, the usual adjusting of the machine for larger or smaller ground clearance in accordance with the density of the crop will not change the position of abutments 82 and 84 appreciably and in any event not enough to make any significant difference in the spring pressure.

The working height of the machine is readily controlled by adjusting crank 50 and the pressure of the rolls by adjusting handles 188. The adjusting movement of abutments 82 and 84 is guided by swinging arms and does not involve any sliding friction. The movement is therefore free and dependable under all conditions and if desired the mechanism may be adapted for positively separating the rolls when the machine is lifted into transport position.

It will now be apparent that mechanism has been devised which will accomplish the objects of the invention, and what is claimed as new and desired to be secured by Letters Patent of the United States is:

1. In a roll control mechanism for a hay conditioner of the type including a frame, a rocking axle journaled on the frame and arranged, upon rocking, to raise and lower the machine, a stationary roll and a roll movable relatively to said stationary roll; the combination of a bearing element from which the movable roll is journaled, said bearing element being guided for movement on the frame toward and away from said stationary roll, an abutment member supported from said frame, a spring engaged with said bearing element and with said abutment and disposed to urged said movable roll toward said stationary roll when said spring is in compression, an arm rigid with said abutment member and pivoted to said frame at a point whereby said abutment member is guided by said arm for movement toward and away from said bearing element, a crank arm rigid with said rocking axle, and a lift strap pivoted to said crank arm and connected to said abutment member in position to shift said abutment member away from said bearing member upon rocking of said rocking axle in a direction to raise the machine.

2. In a roll control mechanism for a hay conditioner of the type including a frame, a rocking axle journaled on the frame and arranged, upon rocking, to raise and lower the machine, a lower stationary roll and an upper roll movable relatively to said stationary roll; the combination of a bearing element from which the movable roll is journaled, said bearing element being guided for movement on the frame toward and away from said stationary roll, an abutment member supported from said frame, a spring engaged with said bearing element and with said abutment and disposed to urge said movable roll toward said stationary roll when said spring is in compression, an arm rigid with said abutment member and pivoted to said frame at a point whereby said abutment member is guided by said arm for movement toward and away from said bearing element, a crank arm rigid with said rocking axle, and a lift strap pivoted to said crank arm and connected to said abutment member in position to swing said abutment member toward said bearing member upon rocking of said rocking axle in a direction to lower said machine.

3. In a roll control mechanism for a hay conditioner of the type including a frame, a rocking axle journaled on the frame and arranged, upon rocking, to raise and lower the machine, a stationary roll and a roll movable relatively to said stationary roll; the combination of a bearing element from which the movable roll is journaled, said bearing element being guided for movement on the frame toward and away from said stationary roll, and abutment member supported from said frame, a spring engaged with said bearing element and with said abutment and disposed to urge said movable roll toward said stationary roll when said spring is in compression, an arm rigid with said abutment member and pivoted to said frame at a point whereby said abutment member is guided by said arm for movement toward and away from said bearing element, and means for causing movement of said abutment member toward and away from said bearing element.

4. In a roll control mechanism for a hay conditioner of the type including a frame, a rocking axle journaled on the frame and arranged, upon rocking, to raise and lower the machine, a stationary roll and a roll movable relatively to said stationary roll; the combination of a bearing element from which the movable roll is journaled, said bearing element being guided for movement on the frame toward and away from said stationary roll, and abutment member supported from said frame, a spring engaged with said bearing element and with said abutment and disposed to urge said movable roll toward said stationary roll when said spring is in compression, an arm rigid with said abutment member and pivoted to said frame at a point whereby said abutment member is guided by said arm for movement toward and away from said bearing element, a crank arm rigid with said rocking axle, a lift strap pivoted to said crank arm and connected to said abutment member in position to shift said abutment member toward and away from said bearing member upon rocking of said rocking axle, and a lost motion connection between said abutment member and said bearing element constructed so that predetermined movement of said abutment member away from said bearing element will take up the lost motion and shift said bearing element in a direction to move said movable roll out of contact with said stationary roll.

5. In a roll control mechanism for a hay conditioner of the type including a frame, a rocking axle journaled on the frame and arranged, upon rocking, to raise and lower the machine, a stationary roll and a roll movable relatively to said stationary roll; the combination of a bearing element from which the movable roll is journaled, said bearing element being guided for movement on the frame toward and away from said stationary roll, an abutment member supported from said frame, a spring engaged with said bearing element and with said abutment and disposed to urge said movable roll toward said stationary roll when said spring is in compression, an arm rigid with said abutment member and pivoted to said frame at a point whereby said abutment member is guided by said arm for movement toward and away from said bearing element, a crank arm rigid with said rocking axle, and a lift strap pivoted to said crank arm and connected to said abutment member in position to shift said abutment member toward and away from said bearing member upon rocking of said rocking axle, and said crank arm being positioned in relation to said rocking axle so that when the machine is lowered it takes a substantially dead center relation to said lift strap.

6. In a roll control mechanism for a hay conditioner of the type including a frame, a rocking axle journaled on the frame and arranged, upon rocking, to raise and lower the machine, a stationary roll and a roll movable relatively to said stationary roll; the combination of a bearing element from which the movable roll is journaled, said bearing element being guided for movement on the frame toward and away from said stationary roll, an abutment member supported from said frame, a spring engaged with said bearing element and with said abutment and disposed to urge said movable roll toward said stationary roll when said spring is in compression, an arm rigid with said abutment member and pivoted to said frame at a point whereby said abutment member is guided by said arm for movement toward and away from said bearing element, a crank arm rigid with said rocking axle, and a lift strap pivoted to said crank arm and connected to said abutment member in position to shift said abutment member toward and away from said bearing member upon rocking of said rocking axle, means for rocking said rocking axle for raising said machine from a lowered working position to a raised transport position and lowering it from a transport to a working position, adjustable stop mechanism positioned to arrest the rocking of said rocking axle at selected lowered positions of said machine for establishing desired working positions thereof, and said crank arm being positioned in relation to said rocking axle so that in the lowered position of the machine it takes substantially a dead center relation to said lift strap.

7. In a roll control mechanism for a hay conditioner of the type including a frame, a roll journaled in a fixed position on the frame and a roll journaled on the frame and movable toward and away from the fixed roll; the combination of a spring connected with the movable roll and stressed to urge said movable roll toward the fixed roll, an abutment portion engaged with and supporting said spring at a point spaced from said movable roll and supported to be movable toward and away from said movable roll, means for supporting said abutment including an elongated arm fixed in relation said abutment and extending transversely of the direction of movement of said abutment, pivot means connecting said arm to said frame at a substantial distance from said abutment whereby said abutment is guided through small movements in a path approaching a straight line movement toward and from said roll, and means for moving said abutment portion in said path.

8. In a roll control mechanism for a hay conditioner of the type including a frame, a rocking axle journaled on the frame and arranged, upon rocking, to raise and lower the machine, a stationary roll and a roll movable relatively to said stationary roll; the combination of a bearing element from which the movable roll is journaled, said bearing element being guided for movement on the frame toward and away from said stationary roll, an abutment member supported from said frame, a spring engaged with said bearing element and with said abutment and disposed to urge said movable roll toward said stationary roll when said spring is in compression, means for guiding said abutment member on said frame for movement toward and away from said bearing element, a crank arm rigid with said rocking axle, and a lift strap pivoted to said crank arm and connected to said abutment member in position to shift said abutment member away from said bearing member upon rocking of said rocking axle in a direction to raise the machine.

References Cited in the file of this patent

UNITED STATES PATENTS

| | | |
|---|---|---|
| 2,966,022 | Getz | Dec. 27, 1960 |
| 2,989,830 | Pristo | June 27, 1961 |